US006938168B1

(12) United States Patent
Gomez et al.

(10) Patent No.: US 6,938,168 B1
(45) Date of Patent: Aug. 30, 2005

(54) INTERACTIVE VIRTUAL LIBRARY SYSTEM FOR EXPEDITIOUSLY PROVIDING AUTOMATIC UPDATES OF USER-DESIRED INFORMATION FROM CONTENT PROVIDERS, AT LEAST ONE OF WHICH IS COMMERCIAL, TO USERS

(76) Inventors: Alirio I. Gomez, Milbank, Tweed, Hadley & McCloy LLP, 1 Chase Manhattan Plz., New York, NY (US) 10005-1413; Christopher E. Chalsen, Milbank, Tweed, Hadley & McCloy LLP, 1 Chase Manhattan Plz., New York, NY (US) 10005-1413; Maria G. Doulos, Millbank, Tweed, Hadley & McCloy 1 LLP, Chase Manhattan Plz., New York, NY (US) 10005-1413; Paula M. Prudenti, Milbank, Tweed, Hadley & McCloy LLP, 1 Chase Manhattan Plz., New York, NY (US) 10005-1413

( * ) Notice: Subject to any disclaimer, the term of this patent is extended or adjusted under 35 U.S.C. 154(b) by 0 days.

(21) Appl. No.: 09/415,578

(22) Filed: Oct. 8, 1999

(51) Int. Cl.[7] .................... G06F 11/30; G06F 12/14; H04L 9/00; H04L 9/32
(52) U.S. Cl. .................. 713/201; 713/200; 713/202
(58) Field of Search ..................... 713/200–202

(56) References Cited

U.S. PATENT DOCUMENTS

| 5,933,811 | A | * | 8/1999 | Angles et al. ............... 705/14 |
| 5,956,697 | A | * | 9/1999 | Usui ............................ 705/32 |
| 6,067,531 | A | | 5/2000 | Hoyt et al. |
| 6,263,330 | B1 | * | 7/2001 | Bessette ....................... 707/4 |
| 6,289,362 | B1 | * | 9/2001 | Van Der Meer ......... 715/501.1 |

OTHER PUBLICATIONS

Miller, Todd, "WebFeat", Library Journal, Mar. 15, 2002, http://www.libraryjournal.com/index.asp?layout=articlePrint&articleID=CA200892.
"Platform SDK: DLLs, Processes, and Threads", Interactive Services. http://msdn.microsfott.com/library/en-us/dllproc/base/interactive_services.asp?frame=true.

(Continued)

Primary Examiner—Gilberto Barrón, Jr.
Assistant Examiner—Grigory Gurshman
(74) Attorney, Agent, or Firm—Milbank, Tweed, Hadley & McCloy LLP

(57) ABSTRACT

The present invention provides an interactive library system having a computer in telecommunication link with at least one user computer and computer of at least one content provider requiring payment for information access. The interactive library system provides information from the content provider to the user by the following steps: Receiving, by the library system computer, user identification and password from the user computer. Comparing, by the library system computer, the received user identification and password with authorized user identifications and corresponding passwords stored in the library system to determine whether to grant access to the interactive library system. If the comparison results in grant of access, then the interactive library system provides the following steps: Receiving, by the library system computer, input from the user computer specifying type of information desired by the user. Establishing, by the library system computer, telecommunication link with the content provider computer. Transmitting, by the library system computer, the type of information desired by the user as search request to the content provider computer. Receiving, by the library system computer, result of the search request from the content provider computer. And providing, by the library system computer, the result to the user computer.

22 Claims, 4 Drawing Sheets

OTHER PUBLICATIONS

Gomez, Alirio, "Technology That Makes a Difference", Newsletter Center, Spring 2004.

Gordon, Stacey, "Update XVIII: What's New on LexisNexis, Westlaw, Loislaw and Versuslaw", Legal Information Alert, vol. 20, No. 10, Nov./Dec. 2001.

"From Sea to Shining Sea—Regional U.S. News Abrounds on the Lexis-Nexis Services", Lexis-Nexis Information Professional Update, Issue 5, May 1999.

Gomez, Alirio, "Creating Your Own Intranet Page Workshop", West Group Information Center, Nov. 2-3, 1998.

"President's Notes", CFALL Notes, Feb. 1999 CFALL Newsletter.

"President's Notes", CFALL Notes, Nov. 1998.

MTHM Library Intranet History.

* cited by examiner

INTERACTIVE VIRTUAL LIBRARY SYSTEM FOR EXPEDITIOUSLY PROVIDING AUTOMATIC UPDATES OF USER-DESIRED INFORMATION FROM CONTENT PROVIDERS, AT LEAST ONE OF WHICH IS COMMERCIAL, TO USERS

BACKGROUND OF THE INVENTION

The present invention relates to an interactive virtual library system. More specifically, this invention relates to an interactive virtual library system for expeditiously providing automatic updates of user-desired information from content providers, at least one of which is a commercial content provider, to users.

Presently, a user of a personal computer ("PC") can access information from a content provider, such as Lexis®-Nexis® or WestLaw® or U.S. Securities and Exchange Commission world wide web site, by establishing a telecommunication link with the computer of the content provider and performing a search to obtain the information desired by the user. For example, the search may seek all relevant information in the databases accessible to the content provider pertaining to a specific company. Generally, the search results will be displayed on the user's monitor in numerical or chronological order.

While the conventional systems for accessing desired information from content providers are satisfactory, there are disadvantages presented by these systems. First, with existing systems, there is required much navigation (i.e., using an input device, such as a PC "mouse" or a keyboard, to go through various files and display pages) by the user to obtain the desired information from the various relevant databases. For example, with the conventional systems, a user has to establish a separate telecommunication link with each content provider to access that content provider's databases. With commercial content providers, i.e., content providers requiring payment for information access, the user generally has to enter at least authorized user identification and password in order to establish a telecommunication link. Then after establishing the telecommunication link, the user is required to navigate to obtain the desired information. This process becomes more and more cumbersome as the number of content providers accessed by the user increases.

Second, the existing systems do not provide for much, if any, customization of user interfaces. For example, there may be specific informational topics from Lexis®-Nexis® or another content provider for which a first user desires periodic information updates. If the first user is an employee of a company in charge of monitoring the activities of competitors, these topics may include financial news relating to each of the competitors, news relating to all lawsuits filed in the industry, and information pertaining to any patents, copyrights or trademarks obtained by the competitors. A second user, by contrast, may desire information updates from specific legal periodicals and technical journals. Despite the different informational topics desired by the first and second users, however, the user interface provided by a conventional system to both users is the same.

A third disadvantage of the conventional systems is illustrated by the following example. After the user has reviewed the desired information from a content provider, she may want to contact an appropriate person to discuss what she read. For example, if what she read relates to issuance of a patent to a competitor that effects her company's products, then she may want to contact the company's outside patent counsel for advice. With existing systems, there is no way for her to initiate contact with the outside patent counsel within the system. If she wants to use e-mail for this purpose, then she will have to go to the e-mail application and run it.

What is desired, therefore, is an interactive virtual library system that addresses the above-described disadvantages of existing systems.

SUMMARY OF THE INVENTION

Accordingly, it is an object of the invention to provide a virtual library system that minimizes navigation by a user in obtaining desired information from various databases and from various content providers.

Another object of the invention is to provide a virtual library system that has a customizable user interface.

Still another object of the invention is to provide a virtual library system that expeditiously allows a user to contact a person specified by the user regarding the information obtained.

Yet another object of the invention is to provide a virtual library system having the above-described features adaptable for both intranet and extranet use.

These and other objects are achieved by an interactive library system having a computer in telecommunication link with at least one user computer and computer of at least one content provider requiring payment for information access. The interactive library system provides information from the content provider to the user by the following steps:
(i) receiving, by the library system computer, user identification and password from the user computer;
(ii) comparing, by the library system computer, the received user identification and password with the authorized user identifications and corresponding passwords stored in the interactive library system to determine whether to grant access to the interactive library system;
(iii) if comparison results in grant of access, then
(iv) receiving, by the library system computer, input from the user computer specifying type of information desired by the user;
(v) establishing, by the library system computer, telecommunication link with the content provider computer;
(vi) transmitting, by the library system computer, the type of information desired by the user as a search request to the content provider computer;
(vii) receiving, by the library system computer, result of the search request from the content provider computer; and
(viii) providing, by the library system computer, the result to the user computer.

DETAILED DESCRIPTION OF THE PREFERRED EMBODIMENT

Figure 1:
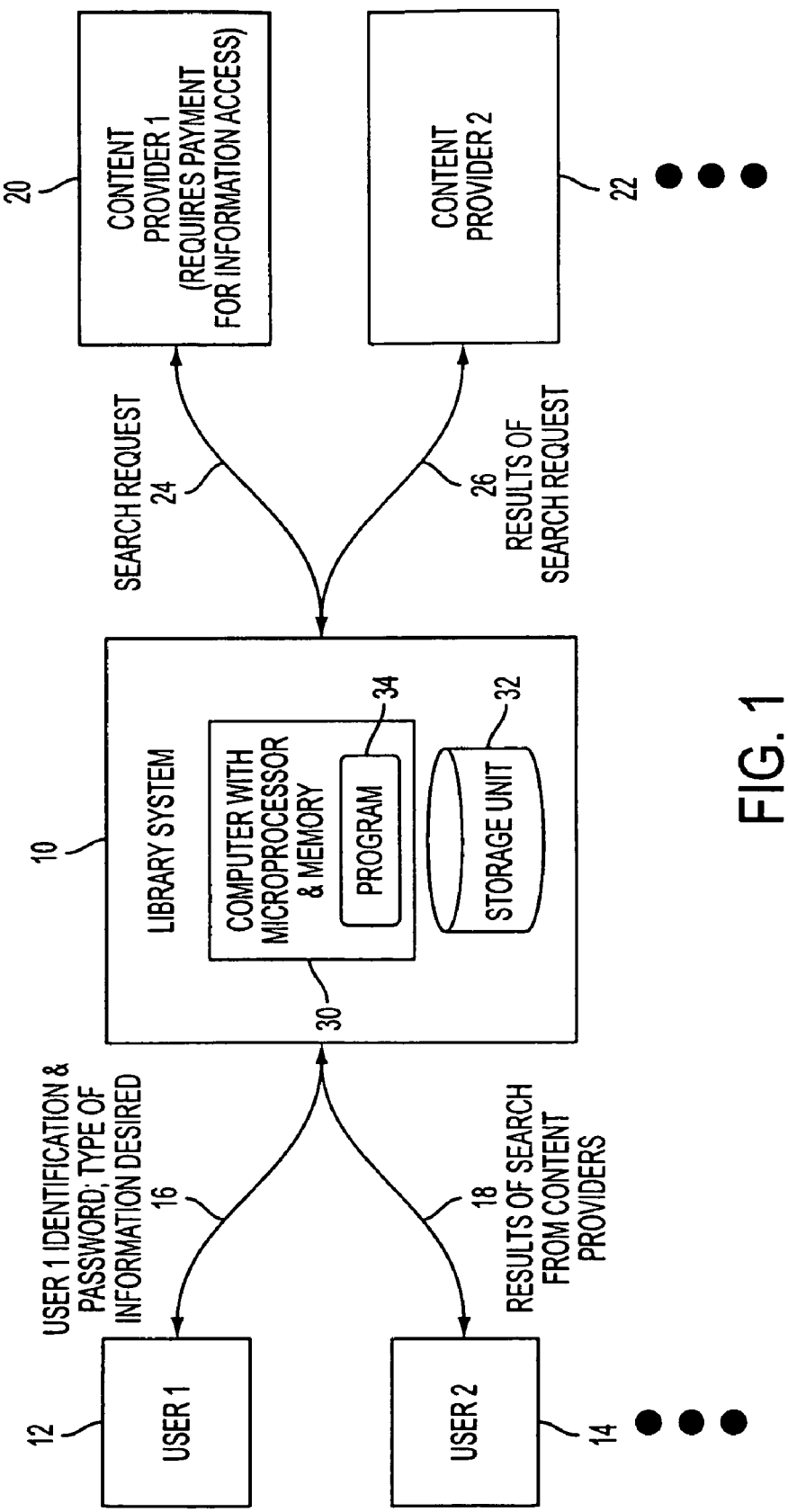
FIG. 1 shows an embodiment of an interactive library system of the present invention.

FIG. 1 shows an embodiment of an interactive library system 10 of the present invention in telecommunication link with user computers, only two of which are shown as reference numerals 12, 14, via telecommunication lines 16, 18, respectively. The interactive library system 10 and the user computers 12, 14 may be part of an intranet, i.e., internal company network, or an extranet, i.e., network where the library system 10 is accessible to outside third party users. As will be apparent to someone skilled in the art, the interactive library system 10 of the present invention is configured to work in both intranet and extranet system architecture.

The library system 10 is also in telecommunication link with computers of content providers, only two of which are shown by reference numerals 20, 22, via telecommunication lines 24, 26, respectively. At least one of the content providers is a commercial content provider, i.e. requiring payment for information access. The telecommunication links may be over a local area network ("LAN") or an Internet connection using a public switched phone network or a cable network. Connection may also be provided by dedicated data lines, cellular, Personal Communication Systems ("PCS"), microwave, satellite networks, or other means known in the art.

The library system 10 of FIG. 1 includes a computer 30 having a microprocessor and memory, and a storage unit 32. The computer 30 may be a server. A program 34, which is preferably stored in memory of computer 30, is operable on the microprocessor. The operation of the program 34 will be described in greater detail with respect to FIG. 2. As used herein, "program" may be source code having one or more subroutines or object code or the like. The storage unit 32, which is preferably a database, stores data related to users, such as authorized user identifications and corresponding passwords, user account data, and type of information desired by the users. It should be noted that data related to users may be stored in more than one storage unit. While FIG. 1 shows the storage unit 32 as part of the library system 10, it should be apparent to one skilled in the art that the storage unit may be external to the library system of the present invention.

Figure 2:
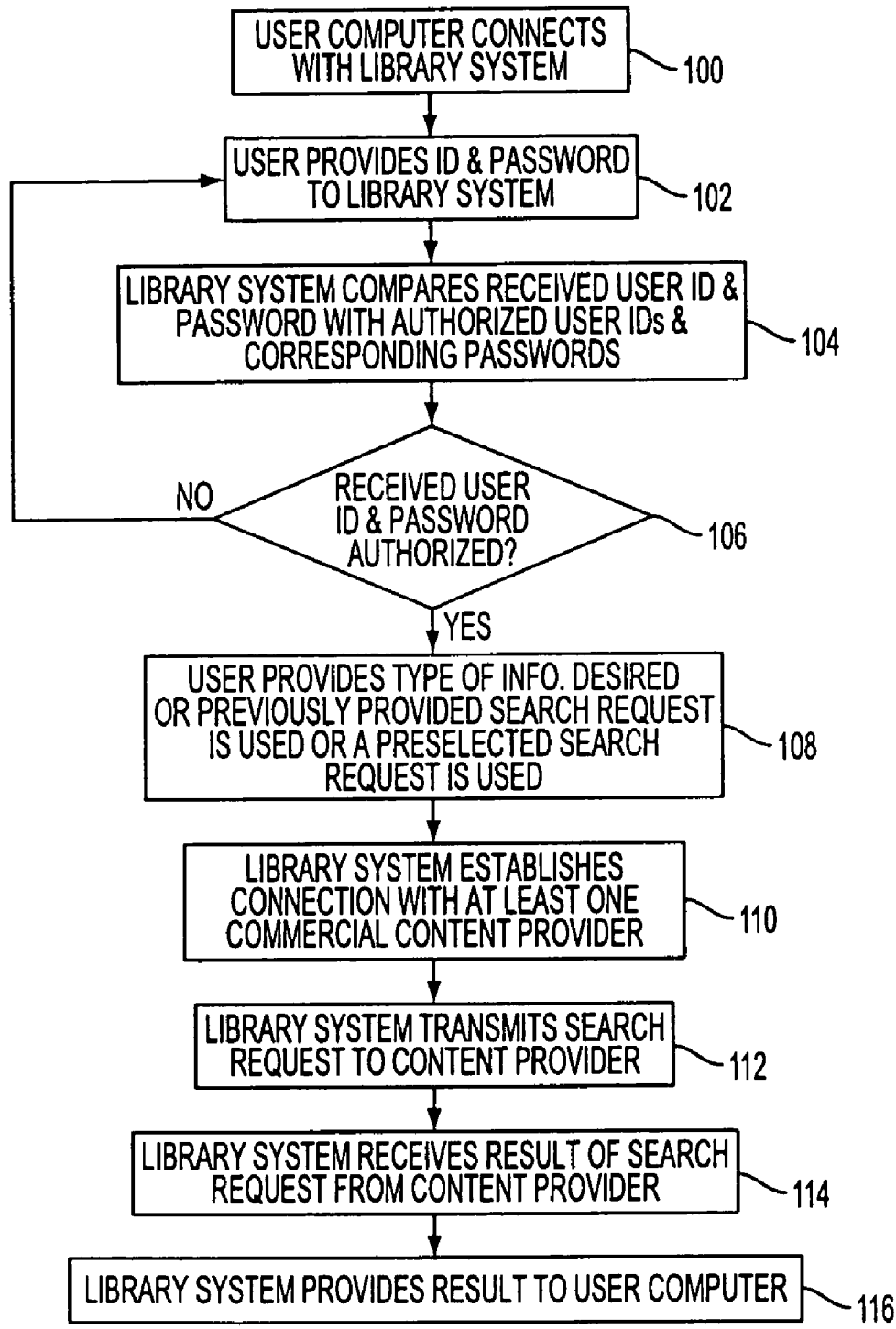
FIG. 2 shows a flowchart of the operation of the interactive library system of FIG. 1.

FIG. 2 is a flowchart of the operation of the interactive library system 10 of FIG. 1. At step 100, a user computer 12, 14 establishes a telecommunication link with the library system 10. The user will then be prompted to provide a user identification and password (step 102). User ID and password may be input by the user through a keyboard, voice recognition system or other known input means, or the user ID and password may be stored in memory of the user computer 12, 14 and provided to the library system 10. At step 104, the library system 10, preferably the microprocessor of the library computer 30, compares the received user ID and password with authorized user IDs and corresponding passwords stored in the storage unit 32.

If the received user ID and password are found to be authorized, then the user is allowed access into the library system 10; otherwise, the user is prompted to provide another user ID and password (step 106). If access is allowed, then at step 108, the user may: (i) input type of information desired, e.g., financial news relating to companies in a specific industry; or (ii) choose to use a previously input search request, e.g., request for financial news relating to companies in a specific industry saved previously; or (iii) use a preselected search request, e.g., a selectable icon labeled "Internet-related Lawsuits" appearing on the user interface, the selection of which (such as by clicking with a PC "mouse") is a request for information relating to Internet-related lawsuits. As used herein, "search request" is to be construed broadly, to include any request for information, such as entering search terms, selecting an icon or a hyperlink, etc.

At step 110, the library system 10 establishes a telecommunication link(s) with relevant preselected content provider(s) based on the user's search request. In the preferred embodiment, at least one of the content providers is a commercial content provider. For example, if the request is for financial news relating to companies in a specific industry, the library system 10 may establish telecommunication links with preselected commercial content providers, such as Lexis®-Nexis® and WestLaw®, as well as preselected free content providers available on the Internet. Relevant content providers' information (e.g., Internet protocol address or web site domain name) is stored in either the memory of the library computer 30 or the storage unit 32 such that the program 34 may operate the microprocessor to access this stored information to enable the library system 10 to establish telecommunication links with the preselected content providers. Where necessary, such as for content providers which require user ID and =password for access, the program 34 further operates the microprocessor of the library computer 30 to access such stored information from either the memory of the library computer or the storage unit 32 to enable access to these content providers.

At step 112, the program 34 operates on the microprocessor of the library computer 30 to transmit the user's search request to the connected content provider(s). The result of the search request is received by the library system 10 from the content provider(s) at step 114. Finally, at step 116, the result is provided by the library system 10 to the user computer 12, 14. While not shown in FIG. 2, it should be apparent to one skilled in the art that following step 116, the library system 10 may return to step 108 for additional search requests or the user may choose to logout or otherwise end access to the library system 10.

Figure 3:
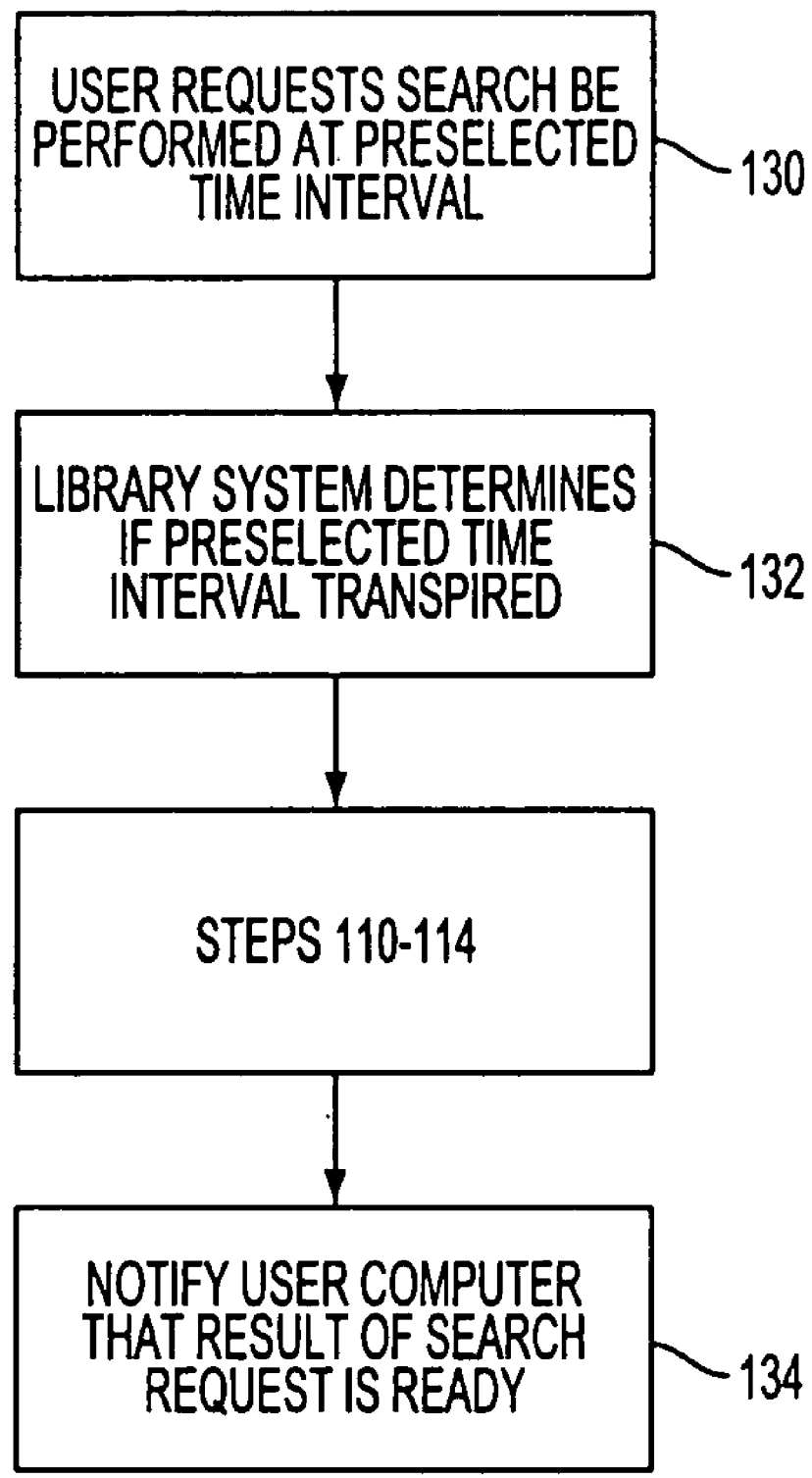
FIG. 3 is a flowchart showing additional functionalities providable to the interactive library system of FIG. 1.

FIG. 3 is a flowchart showing additional functionalities that may be provided to the interactive library system 10 of FIG. 1. In addition to the steps set forth in FIG. 2, the user is provided with the option of requesting the library system 10 to perform a search request at a preselected time interval (step 130). For example, the user may request that a search for financial news relating to companies in a specific industry be performed once a week. This preselected time interval chosen by the user is preferably stored in the storage unit 32. Step 130 may follow step 108 of FIG. 2. At step 132, the library system determines whether the preselected time interval has transpired.

If the preselected time interval has transpired, then the library system 10 performs steps 110–114 of FIG. 2. Optionally, if requested by the user, the library system 10 may notify the user after receiving result of the search request from the content provider(s) that such results are ready for review by the user (step 134). Notification is preferably by electronic communication means, such as an appropriate e-mail message to the user.

Figure 4:
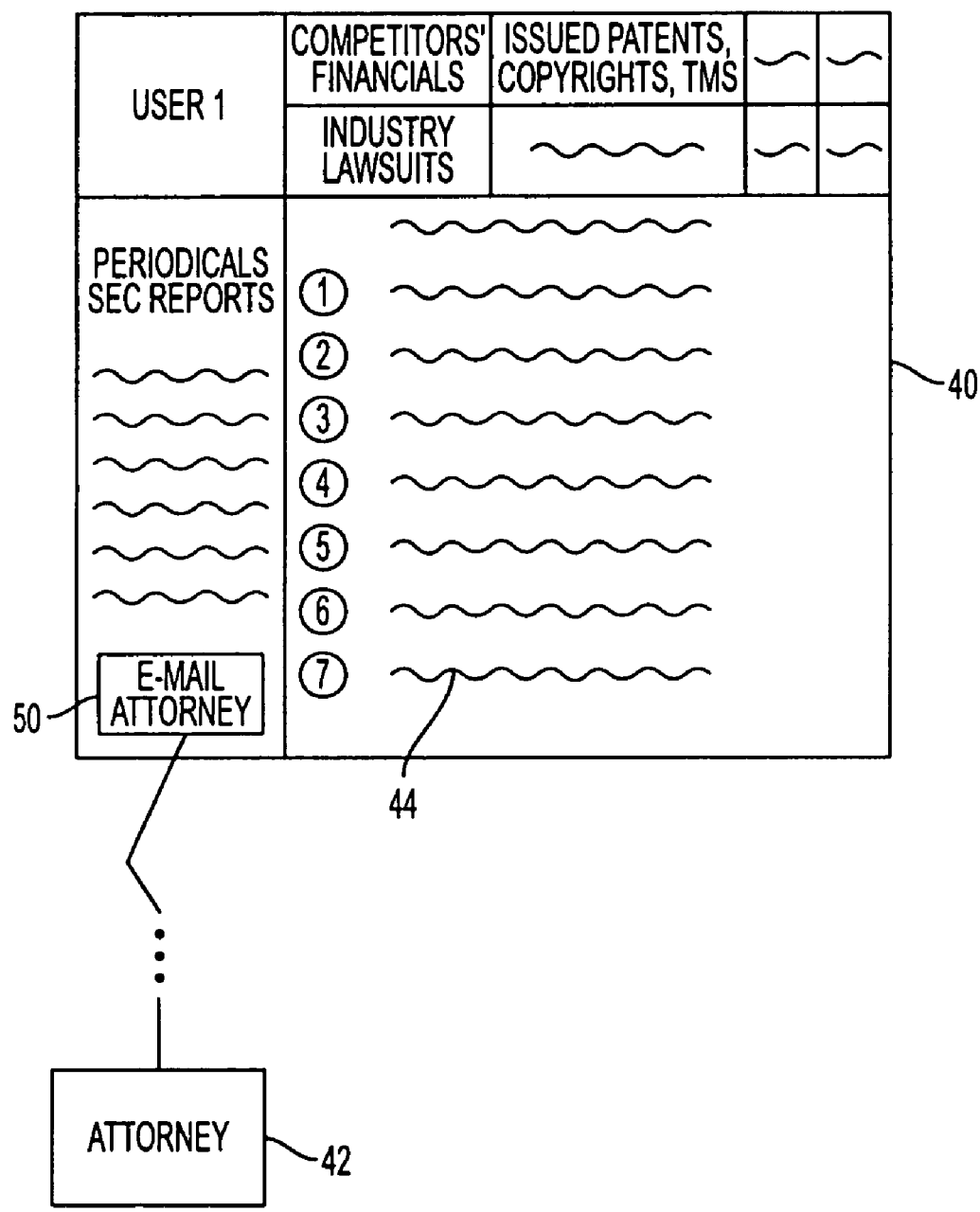
FIG. 4 shows an embodiment of a customized user interface provided by the interactive library system of FIG. 1.

Each user of the library system 10 may request that she be provided with a customized user interface. FIG. 4 shows an embodiment of a customized user interface 40 for User 1 (reference numeral 12 in FIG. 1). The customized user interface 40 is developed based on information provided by the user 12. The customized user interface data is preferably stored in the storage unit 32; however, it may also be stored in the user's computer from which the library system 10 will access the data to provide the customized user interface. The user interface 40 may be developed using templates or other means known to those skilled in the art to provide flexibility and expeditious configurability. Along the left-hand side and the top of the user interface 40, there are shown types of information desired by this user—such as "Periodicals," "SEC Reports," "Competitors'Financials," "Industry Lawsuits," and "Issued Patents, Copyrights, and Trademarks"—as selectable words or buttons. The user interface 40 is designed so that these selectable words or buttons are accessible by the user via an input device, such as the PC "mouse."

There is displayed a numerical list 44 of results of a search request received from content providers 20, 22. For example, this may be a list of patents, copyrights and trademarks issued to competitors within the last week. If the user desires to see an updated list of industry lawsuits, then she uses an input device to select "Industry Lawsuits." The library system 10 will perform steps 110–116 of FIG. 2 to provide an updated list of lawsuits on the display screen.

The user interface 40 also includes a selectable button 50 for electronically communicating with a contactee preselected by the user. In the exemplary drawing of FIG. 4, the electronic communication means is by e-mail and the preselected contactee is an attorney 42. As an example, if the user 12 is reviewing the list of patents, copyrights and trademarks issued to competitors and discovers that one of the issued patents relates to her company's products, then she may want to immediately contact her company's patent counsel 42 for advice. She can contact the patent attorney 42 by choosing the selectable button 50 with the appropriate input device. This will automatically run the e-mail application, by which the desired message can be sent over an appropriate local area network, wide area network, or other connection means as described above with respect to FIG. 1.

It should be apparent to one skilled in the art that the configuration of the user interface in FIG. 4 is merely one of many possibilities. The types of information desired by a user may be placed anywhere on the display screen and in any order desired. Also, although a numerical list of relevant information is illustrated in FIG. 4, the relevant information may be displayed in any suitable format.

A user may be charged a fee for use of the library system 10 of the present invention. While not to be construed as exhaustive, the following methods (alone or some combination thereof) are contemplated: First, a user may be billed based on the time amount of access to the library system 10. The time amount of access data for users are preferably stored in the storage unit 32. After a preselected time period, such as one month, an account statement for the user will be generated.

Second, a user may be billed based on the time amount of access to each content provider. The time amount of access to each content provider data for users are preferably stored in the storage unit 32. After a preselected time period, such as one month, an account statement for the user will be generated.

Third, a user may be billed based on the time amount of access to commercial content providers. The time amount of access to commercial content providers data for users are preferably stored in the storage unit 32. After a preselected time period, such as one month, an account statement for the user will be generated.

Fourth, a user may be billed based on the number of search queries transmitted by the library system 10 to the content providers. The number of transmitted search queries data for users are preferably stored in the storage unit 32. After a preselected time period, such as one month, an account statement for the user will be generated.

Finally, a user may be billed directly by the content providers accessed by the user through the library system 10. How to bill the user will be determined by each content provider accessed. For example, the user may be billed based on the time amount of access to the content provider or the number of search queries transmitted to the content provider. The content providers will access the user information stored in the storage unit 32 of the library system 10 to generate an account statement.

Those skilled in the art will recognize that the method and apparatus of the present invention has many applications, and that the present invention is not limited to the representative examples disclosed herein. Moreover, the scope of the present invention covers conventionally known variations and modifications to the methods and system components described herein, as would be known by those skilled in the art.

What is claimed is:

1. In an interactive library system having a computer in telecommunication link with at least one user computer and computer of at least one content provider requiring payment for information access, a method for providing information from the content provider to the user which comprises:

receiving, by the library system computer, user identification and password âom the user computer;

comparing, by the library system computer, said received user identification and password with authorized user identifications and corresponding passwords stored in the library system to determine whether to grant access to the interactive library system;

if comparison results in grant of access, then
 receiving, by the library system computer, input from the user computer specifying type of information desired by the user;
 establishing, by the library system computer, telecommunication link with content provider computer;
 transmitting, by the library system computer, said type of information desired by the user as a search request to the content provider computer;
 receiving, by the library system computer, result of said search request from the content provider computer;
 providing, by the library system computer, said result to the user computer; and
 customizing a user interface provided by the interactive library system to the user computer based on type of information desired by the user.

2. The method of claim 1, further comprising:
 providing a user interface, by the interactive library system to the user computer, that includes an interactive element, the selection of said element by the user activating a communication program to enable communication with a pre-selected contactee.

3. The method of claim 1, further comprising:
 determining, by the library system computer, time amount of access to the interactive library system by the user computer; and
 strong, in the library system, said time amount of access to the interactive library system by the user computer.

4. The method of claim 3, further comprising:
 generating an account statement after a preselected period of time based on said time amount of access for the user computer stored in the library system.

5. The method of claim 1, further comprising:
 determining, by the library system computer, time amount of access by the user computer to each content provider; and storing, by the library system, said time amount of access by the user computer to each content provider.

6. The method of claim 5, further comprising:
generating an account statement after a preselected period of time based on said time amount of access by the user computer to each content provider stored in the library system.

7. The method of claim 1, further comprising:
determining, by the library system computer, time amount of access by the user computer via the library system computer to each content provider requiring payment for information access; and
storing, by the library system, said time amount of access by the user computer to each content provider requiring payment for information access.

8. The method of claim 7, further comprising:
generating an account statement after a preselected period of time based on said time amount of access by the user computer to each content provider requiring payment for information access stored in the library system.

9. The method of claim 1, further comprising:
determining, by the library system computer, number of said search requests transmitted to the content providers for the user computer; and
storing, by the library system, said number of search requests transmitted for the user computer.

10. The method of claim 9, further comprising:
generating an account statement after a preselected period of time based on said number of search requests for the user computer stored in the library system.

11. The method of claim 1, further comprising:
accessing, by the providers accessed by the user computer through the library system, preselected user information stored in the library system; and
generating an account statement, by the content providers accessed by the user computer, after a preselected time period based on said preselected user information stored in the library system.

12. The method of claim 1, further comprising:
receiving, by the system computer, input from the user computer specifying a preselected time interval for transmitting search request to the content provider.

13. The method of claim 1, further comprising:
notifying, by the library system computer, the user computer that said result of said search request is ready for review by the user.

14. The method of claim 13, wherein said notification is by electronic communication.

15. An interactive library system providing telecommunication links with at least one user computer and computer of at least one content provider requiring payment for information access, which comprises:
a library computer adapted to receive and transmit data over telecommunication links, said library computer having a microprocessor and a first storage unit;
a second storage unit electrically coupled to said library computer to store user identifications and corresponding passwords;
a program operable on said microprocessor stored in said first storage unit, said program comparing user identification and password received from the user computer with said user identifications and corresponding passwords stored in said second storage unit to determine whether the user computer is authorized;
said program, if the user computer is determined to be authorized, causing said library computer to communicate with content provider computer to transmit type of information desired by the user as a search request and to receive result of said search request; and
customizing a user interface provided by the interactive library system to the user computer based on type of information desired by the user.

16. The interactive library system of claim 15, wherein said first and second storage units are the same.

17. The interactive library system of claim 15, which further comprises:
a third storage unit electrically coupled to said library computer to store user-specific data.

18. The interactive library system of claim 17, wherein said user-specific data includes customized user interface data.

19. The interactive library system of claim 17, wherein said user-specific data includes user account data.

20. The interactive library system of claim 19, wherein said user account data includes time amount of access by the user computer to said library computer.

21. The interactive system of claim 19, wherein said user account data includes time amount of access by the user computer via said library computer to the computer of each content provider requirement payment for information access.

22. The library system of claim 17, wherein said second and third storage units are the same.

* * * * *